Feb. 16, 1926.  
G. G. IRIE  
1,573,113  
AUTOMOBILE LICENSE PLATE HOLDER  
Filed August 11, 1925
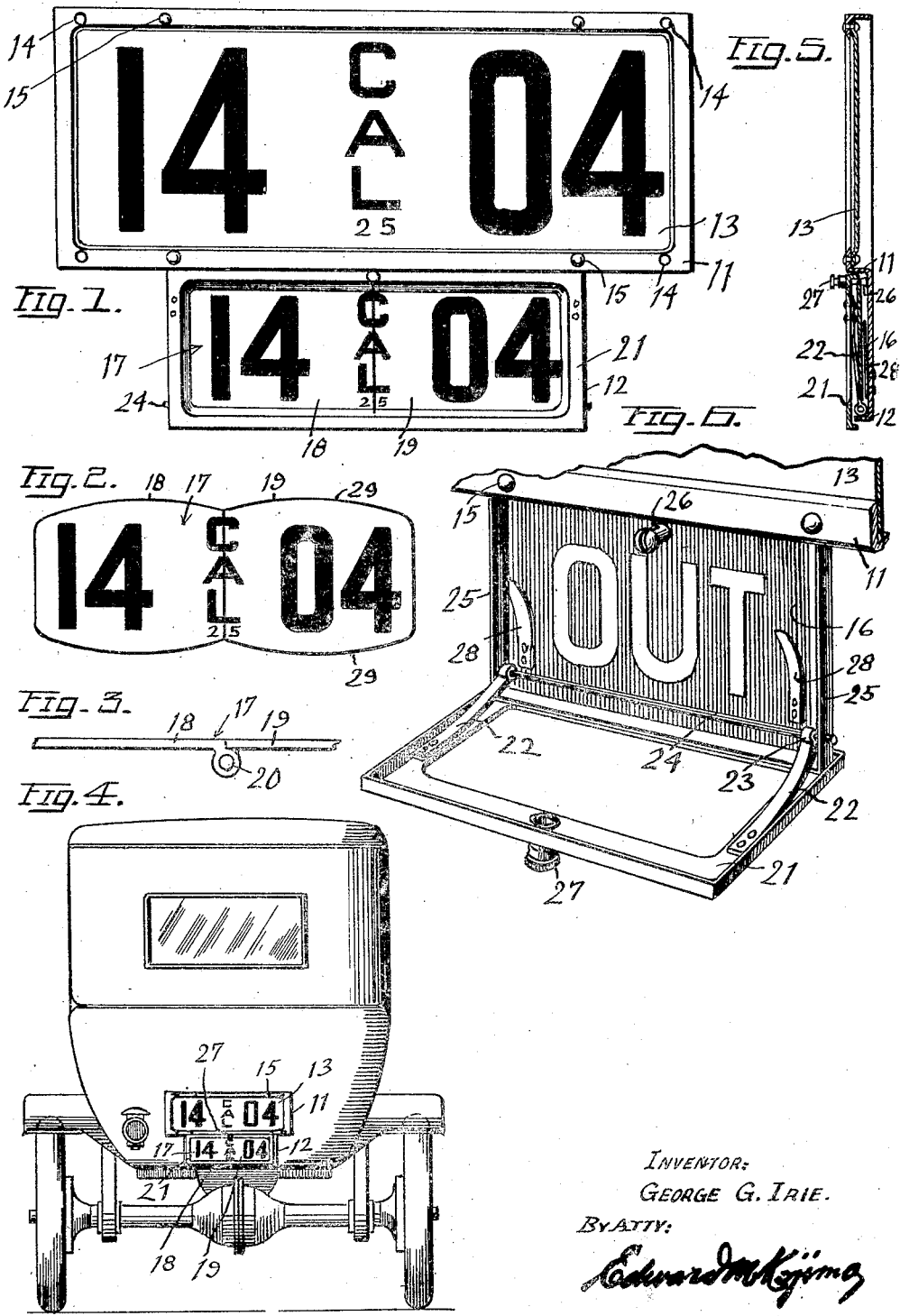
INVENTOR:  
GEORGE G. IRIE.  
BY ATTY:

Patented Feb. 16, 1926.

1,573,113

UNITED STATES PATENT OFFICE.

GEORGE G. IRIE, OF LOS ANGELES, CALIFORNIA.

AUTOMOBILE LICENSE-PLATE HOLDER.

Application filed August 11, 1925. Serial No. 49,566.

*To all whom it may concern:*

Be it known that I, GEORGE G. IRIE, a subject of the Emperor of Japan, residing in the city and county of Los Angeles and State of California, have invented a new and useful Automobile License-Plate Holder, of which the following is a specification.

This invention relates to an improved license plate holder, and has for its primary object to protect the automobile against theft, and to serve as a holder for the automobile license plate.

With such objects in view, and others which will appear as the description proceeds, the invention consists of a frame member adapted to hold the regular license plate, and auxiliary frame member integral with the main frame member, and having an integral plate inscribed with the word "Out," or other suitable word to signify that the rightful owner or driver of the automobile has left the same, a collapsible auxiliary license plate mounted detachably in the auxiliary frame, and normally covering the "Out" legend, and a cover hinged to the auxiliary frame portion, and serving to retain the auxiliary license plate in position to conceal the "Out" legend.

The drawings illustrate a construction of the invention which I now consider to be the best embodiment thereof, but it is to be understood that the device shown is merely illustrative, and that such changes may be made when desired as are within the scope of the appended claims.

In the drawings, Figure 1 is a front elevation of my improved license plate holder. Fig. 2 is a front view of the auxiliary license plate detached from the holder. Fig. 3 is a fragmentary detail view of the auxiliary plate showing the hinge construction. Fig. 4 is a rear view of an automobile having my improved license plate holder attached thereto. Fig. 5 is a transverse sectional elevation of the device. Fig. 6 is a fragmentary and perspective view showing the auxiliary license plate removed to display the signal or legend inscribed on the holder.

Referring to the drawings, the main frame member 11 is integral with the auxiliary frame holder 12, and is adapted to hold the license plate 13. The main frame member is provided with holes 14 for securing the holder to a suitable support (not shown), and is provided with rivets 15, which secure the regular license plate 13 within the main frame. The auxiliary frame member 12 has an integral back plate 16 inscribed, in the present case, with the legend "Out," which, when exposed or displayed will serve as a signal to indicate that the rightful owner or driver of the automobile has left the same.

The auxiliary license plate 17 consists of members 18 and 19 connected by hinge elements 20, and provided with the inscription or characters carried by the regular license plate. The auxiliary plate is secured in position by the skeleton cover member 21. The hinge elements 22 are made of spring metal and have one end secured to cover member 21, and the opposite end provided with a knuckle 23. A pintle member 24 extends across the back plate and is fixed to the side members 25, and extends through the knuckles 23. The spring members 22 serve to press the cover member 21 firmly on the auxiliary license plate when in position to cover the back plate, and further serve to support the cover member in open position. A spring catch 26 extending from the back plate 16 is adapted to engage with member 27, which also serves as a handle, to secure the cover in its closed position. Supporting springs 28, mounted on the back plate 16, serve to press the auxiliary license plate outwardly against the skeleton cover.

In use, if the driver or owner wishes to leave the automobile, he will turn down the cover 21, and remove the license plate 17, which is collapsible and has rounded edges 29, so that it may be carried in the pocket without injury to the same. The removal of the auxiliary plate will then display the signal on the back plate. In the present instance, the back plate is provided with white letters and a red background. Should anyone other than the rightful owner or driver attempt to drive the automobile, detection would follow quickly. The one-piece construction of the holder will render alteration thereof difficult.

While the drawings show a regular license plate riveted to the holder, the same may, as a modification, be made integral with the holder, and such construction would be desirable in the event that the device is adopted by a State or by an insurance company.

From the foregoing description taken in connection with the accompanying drawing, it may be seen that I have provided a useful plate holder, adapted for holding a license plate, and adapted to prevent unauthorized persons tampering with or driving the automobile when the owner leaves the same; the invention constituting a combined license plate holder and a signal device by which unauthorized use of the automobile would result in quick detection.

What is claimed is:

1. A license plate holder comprising a main frame portion adapted to hold a regular license plate, an auxiliary frame portion integral with the main frame portion, a detachable and collapsible auxiliary license plate inscribed with characters corresponding to the main license plate, and mounted in the auxiliary frame portion, a back plate integral with the auxiliary frame portion and bearing a signal, said auxiliary license plate covering the signal when in position in the auxiliary frame, a cover hinged to the auxiliary frame portion and adapted to retain the auxiliary license plate in its operative position, and means for maintaining the cover in its operative position.

2. A license plate holder comprising a main frame portion adapted to hold a regular license plate, an auxiliary frame portion integral with and beneath the main frame portion, a back plate integral with the auxiliary frame and bearing an inscribed signal, a detachable and collapsible auxiliary license plate having inscribed characters corresponding with the regular license plate and normally covering the signal, a skeleton cover hinged to the auxiliary frame and adapted to maintain the auxiliary plate in position, and means for securing the cover in closed position.

3. A license plate holder comprising a main frame portion adapted to hold a regular license plate, an auxiliary frame portion integral with the main frame portion and beneath the same, a back plate integral with the auxiliary frame, a signal carried by the back plate, an auxiliary license plate adapted to cover the signal on the back plate and having characters and colors corresponding with the regular license plate, a pintle member mounted in the auxiliary frame and fixed to the end portions thereof, spring hinges pivotally connected to the pintle member, a skeleton cover adapted to maintain the auxiliary license plate in its operative position, said spring hinge members having one end fixed to the cover, supporting springs fixed to the back plate and serving to press the auxiliary license plate against the skeleton cover, and a spring latch serving to secure the cover in its closed and operative position.

4. A license plate holder comprising a main frame portion adapted to hold a regular license plate, an auxiliary frame portion beneath and integral with the main frame portion, a back plate integral with the auxiliary frame portion and bearing an inscribed signal of contrasting colors relative to the colors of the regular license plate, a skeleton cover operatively connected relative to the auxiliary frame portion, spring hinge elements connecting the cover with the auxiliary frame portion and serving to hold the cover in open and closed position and to press the cover against the back plate in closed position, an auxiliary license plate consisting of two hinged and foldable members adapted to fit the pocket in folded position, and bearing characters corresponding to the characters on the regular license plate, the auxiliary license plate serving to cover the back plate in its operative position, supporting springs fixed to the back plate and serving to press the auxiliary license plate against the skeleton cover, said supporting springs being disposed on opposite ends of the auxiliary frame portion, and snap fastener elements arranged to secure the cover in closed position.

GEORGE G. IRIE.